United States Patent
Kaburaki et al.

(10) Patent No.: US 9,286,206 B2
(45) Date of Patent: Mar. 15, 2016

(54) MEMORY SYSTEM

(71) Applicant: Kabushiki Kaisha Toshiba, Minato-ku (JP)

(72) Inventors: Satoshi Kaburaki, Tokyo (JP); Atsushi Kunimatsu, Funabashi (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 265 days.

(21) Appl. No.: 14/108,682

(22) Filed: Dec. 17, 2013

(65) Prior Publication Data

US 2015/0039808 A1 Feb. 5, 2015

Related U.S. Application Data

(60) Provisional application No. 61/860,056, filed on Jul. 30, 2013.

(51) Int. Cl.
*G06F 12/00* (2006.01)
*G06F 12/02* (2006.01)

(52) U.S. Cl.
CPC .................. *G06F 12/0246* (2013.01)

(58) Field of Classification Search
None
See application file for complete search history.

(56) References Cited

U.S. PATENT DOCUMENTS

| 6,009,426 A * | 12/1999 | Jouenne | G06F 9/466 |
| 8,341,358 B1 * | 12/2012 | Edmondson | G06F 13/00 711/122 |
| 2002/0078161 A1 * | 6/2002 | Cheng | H04L 12/2803 709/208 |
| 2013/0212319 A1 | 8/2013 | Hida et al. | |

FOREIGN PATENT DOCUMENTS

| JP | 2000-148583 | 5/2000 |
| JP | 2008-65859 | 3/2008 |
| JP | 2012-128646 | 7/2012 |
| WO | WO 2012/081730 A1 | 6/2012 |

* cited by examiner

*Primary Examiner* — Kevin Verbrugge
*Assistant Examiner* — Craig Goldschmidt
(74) *Attorney, Agent, or Firm* — Oblon, McClelland, Maier & Neustadt, L.L.P.

(57) ABSTRACT

According to one embodiment, a memory system includes nonvolatile memories each storing data and an address table for acquiring an address of the data, and a control unit which is configured to be capable of accessing the nonvolatile memories in parallel, and issues table read requests for reading the address tables and data read requests for reading the data to the nonvolatile memories in response to read commands from a host. When a table read request and a data read request are issued to a same nonvolatile memory, the control unit processes the data read request in priority to the table read request.

20 Claims, 9 Drawing Sheets

MEMORY SYSTEM

CROSS-REFERENCE TO RELATED APPLICATIONS

This application claims the benefit of U.S. Provisional Application No. 61/860,056, filed Jul. 30, 2013, the entire contents of which are incorporated herein by reference.

FIELD

Embodiments described herein relate generally to a memory system.

BACKGROUND

As one type of electrically rewritable nonvolatile semiconductor memory, a NAND flash memory is known. Further, a memory system having NAND flash memories (NAND chips) mounted thereon has been developed. In such a system, when sequentially issuing read commands with respect to the NAND chips, a data read speed is lowered in the entire memory system.

DETAILED DESCRIPTION

In general, according to one embodiment, a memory system comprises: nonvolatile memories each storing data and an address table for acquiring an address of the data; and a control unit which is configured to be capable of accessing the nonvolatile memories in parallel, and issues table read requests for reading the address tables and data read requests for reading the data to the nonvolatile memories in response to read commands from a host. When a table read request and a data read request are issued to a same nonvolatile memory, the control unit processes the data read request in priority to the table read request.

First Embodiment

1. Configuration of Memory System

Figure 1:
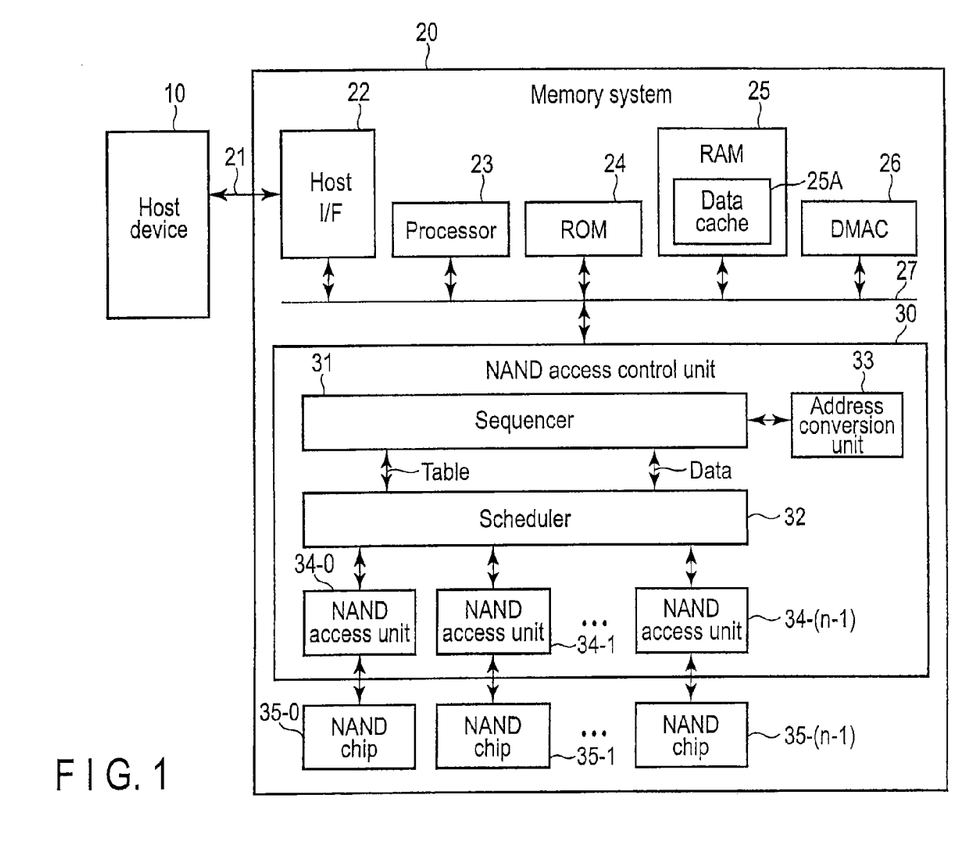
FIG. 1 is a block diagram of a memory system according to a first embodiment.

FIG. 1 is a block diagram of a memory system 20 according to a first embodiment. The memory system 20 comprises a nonvolatile semiconductor memory. In the following embodiment, as a nonvolatile semiconductor memory, a NAND flash memory will be taken as an example and explained.

The memory system 20 is connected to a host device 10 such as a personal computer through an interface 21. As the interface 21, for example, a serial advanced technology attachment (SATA) interface, a universal flash storage (UFS) interface, or the like is used. The memory system 20 processes a command supplied from the host device 10 or transmits/receives data to/from the host device 10. The memory system 20 is used as an external memory, e.g., a secondary storage device of the host device 10, and it has a function of storing data that is a write request target from the host device 10 or outputting to the host device 10 data that is a read request target from the host device 10. The host device 10 comprises hardware and software for accessing the memory system 20, and it also comprises a power supply circuit for supplying electric power to the memory system 20.

The memory system 20 comprises a host interface circuit (a host I/F) 22, a processor 23, a read only memory (ROM) 24, a random access memory (RAM) 25, a direct memory access controller (DMA Controller: DMAC) 26, a NAND access control unit 30, and NAND flash memories (which will be referred to as NAND memories, NAND memory chips, NAND chips, or the like) 35-0 to 35-(n−1). It is to be noted that, in the description of this embodiment, when the NAND chips 35-0 to 35-(n−1) do not have to be distinguished from each other, they may be shown while omitting their branch numbers, and such description corresponds to respective explanations concerning each of the NAND chips 35-0 to 35-(n−1). Other reference signs with branch numbers are treated in the same manner as the NAND chips. The host interface circuit 22, the processor 23, the ROM 24, the RAM 25, the DMA controller 26, and the NAND access control unit 30 are connected to each other through a bus 27.

The host interface circuit 22 is connected to the host device 10 through the interface 21. The host interface circuit 22 executes interface processing with respect to the host device 10 and the host memory system 20 based on predetermined interface standards.

The ROM 24 stores a firmware or the like used by the processor 23. The RAM 25 is used as a work area for the processor 23, the DMA controller 26, and the NAND access control unit 30, and is a volatile storage unit that temporarily stores various kinds of data. Further, the RAM 25 comprises a data cache 25A that temporarily stores data supplied from the host device 10 and temporarily stores data read from the NAND chip 35.

The DMA controller (a data transfer unit) 26 is a hardware module that dedicatedly performs data transfer. The DMA controller 26 controls data transfer between the host interface circuit 22 and the NAND chip without using the processor 23. It is to be noted that the memory system 20 may be configured so that the processor 23 can execute processing of the DMA controller 26.

The processor 23 is a central processing unit (CPU) that collectively controls respective modules in the memory system 20. When the memory system 20 receives electric power from the host device 10, the processor 23 reads out firmware stored in the ROM 24 or the NAND chip 35 and executes predetermined processing, or creates various kinds of tables on the RAM 25 by using the data read from the NAND chip 35 and executes predetermined processing with use of this table.

The NAND access control unit 30 is connected to the NAND chips 35-0 to 35-(n−1) and executes a data read operation, a data write operation, and a data erase operation with respect to each of the NAND chips 35-0 to 35-(n−1). The NAND access control unit 30 is configured so that it can access the NAND chips 35-0 to 35-(n−1) in parallel. The NAND access control unit 30 comprises a sequencer 31, a scheduler 32, an address conversion unit 33, and NAND access units 34-0 to 34-(n−1).

The sequencer 31 receives a read command and a logic address supplied from the host device 10. The sequencer 31 responds to the read command and issues read requests (including a table read request and a data read request) which is used for reading data from the NAND chip 35.

The scheduler 32 receives the read requests issued by the sequencer 31 and manages the read requests for each of the NAND chips 35-0 to 35-(n−1). Moreover, the scheduler 32 determines read requests that can be issued to the NAND chips 35-0 to 35-(n−1) in parallel and supplies the read requests to the NAND access units 34-0 to 34-(n−1).

The address conversion unit 33 eventually acquires a physical address of data on the NAND chip 35 by using the logical address (a host logical address) supplied from the host device 10 together with the read command. In the case of acquiring the physical address of the data, a table (an address table) stored in the NAND chip 35 is used. Specifically, the address conversion unit 33 (1) acquires a physical address of the table from the host logical address, (2) acquires a logical address (a NAND logical address) of data on the NAND chip 35 from the table read from the NAND chip 35, and (3) obtains a physical address (a NAND physical address) of the data on the NAND chip 35 from the NAND logical address. The NAND logical address is a logical address that designates a management unit for managing data in the memory system, and the management unit of the NAND logical address may be different from or may be the same as a management unit of the host logical address. The NAND physical address is a real address which is a physical address on the NAND chip. To convert such a logical address into a physical address, the address conversion unit 33 converts the address by using an address conversion table stored in the NAND chip, or caches a part of the address conversion table stored in the NAND chip into the memory system, or converts the address by using the cached address conversion table.

Each of the NAND access units 34-0 to 34-0(n−1) is connected to each of the NAND chips 35-0 to 35-(n−1). Each of the NAND access units 31-0 to 34-(n−1) directly accesses each of the NAND chips 35-0 to 35-(n−1) and executes a data read operation, a data write operation, or a data erase operation.

Each NAND chip (the NAND flash memory) 35 is a storage device that can store data in a nonvolatile manner, and it is used as a storage device to save user data, programs, or internal data of the memory system 20. Specifically, it stores data designated by the host device 10 or stores management information (including the address conversion table) of the memory system 20 or data that is to be stored in the nonvolatile manner such as firmware. The NAND chip 35 includes a memory cell array in which memory cells are arranged in a matrix form, and this memory cell array is configured by arranging physical blocks each of which is a unit of data erase. In the NAND chip 35, data is written or data is read for each physical page. Each physical page is comprised of memory cells. Each physical block (a memory block, a data block) is comprised of physical pages.

2. Operation of Memory System

Figure 2:
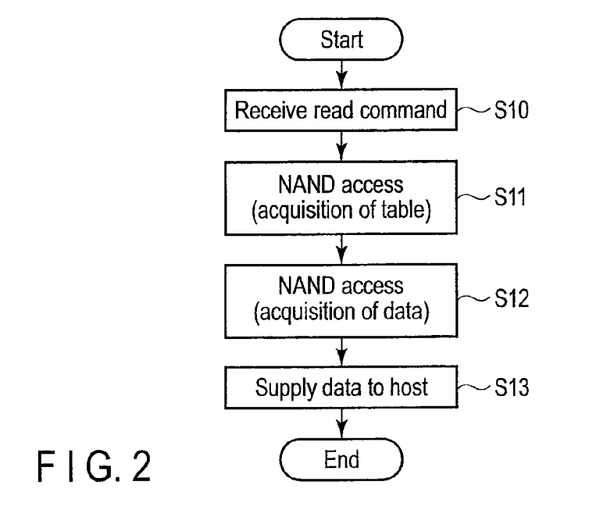
FIG. 2 is a flowchart for explaining a read operation of a NAND access control unit.

An operation of the thus configured memory system 20 will be explained. First, a basic read operation of the NAND access control unit 30 will be described. FIG. 2 is a flowchart for explaining a read operation of the NAND access control unit 30.

At the time of reading data, the host device 10 first supplies a read command and a logical address (a host logical address) to the memory system 20, and the NAND access control unit 30 receives the read command and the host logical address (a step S10). Subsequently, the NAND access control unit 30 acquires a physical address of a table (an address table) for obtaining a logical address (a NAND logical address) of data on the NAND chip 35 by using the host logical address. Then, the NAND access control unit 30 accesses one of the NAND chips 35-0 to 35-(n−1) by using the physical address of the table and reads the table (a step S11).

Subsequently, the NAND access control unit 30 acquires a logical address (a NAND logical address) of data designated by the host logical address on the NAND chip 35 by using the read table, and further converts the NAND logical address into a NAND physical address. Then, the NAND access control unit 30 accesses one of the NAND chips 35-0 to 35-(n−1) by using the NAND physical address and reads data (a step S12).

The data read from the NAND chip 35 is supplied to the host device 10 by the DMA controller 26 (a step S13). Specifically, the DMA controller 26 temporarily stores the data read from the NAND chip 35 into the data cache 25A in the RAM 25. Thereafter, a read result supplied from the NAND access unit 34 to the scheduler 32 is information including an address of the data stored in the data cache 25A. Subsequently, the data is formed to a predetermined data size, and then the DMA controller 26 transfers the data from the data cache 25A to the host device 10. It is to be noted that the DMA controller 26 is not an essential requirement, and hence the memory system 20 may be configured so that the data read from the NAND chip 35 can be directly processed in the NAND access control unit 30.

Figure 3:
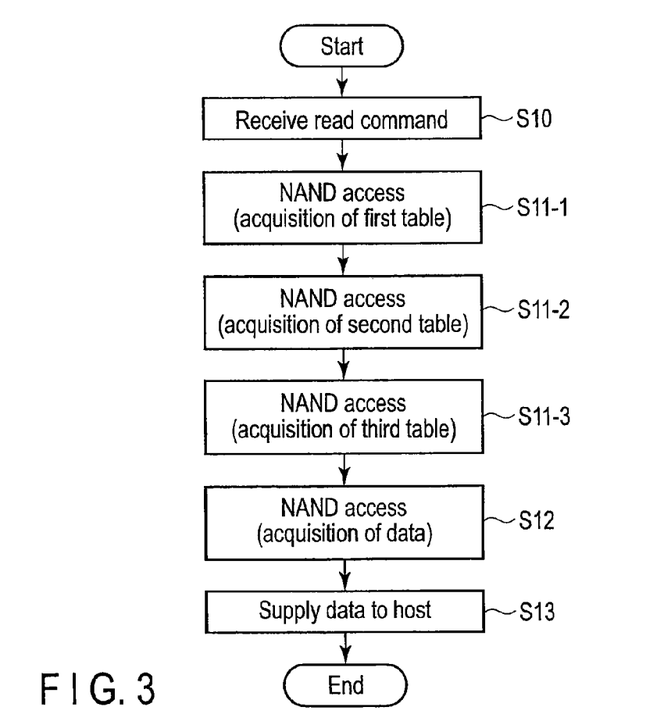
FIG. 3 is a flowchart for explaining a read operation of a NAND access control unit according to another structural example.

Further, the table (the address table) has a hierarchical structure, and more than one table may be read out to acquire a NAND logical address of the data. FIG. 3 is a flowchart for explaining a read operation of a NAND access control unit 30 according to another structural example. For example, a description will be given as to an example where three tables (a first table, a second table, and a third table) are sequentially read out to acquire a NAND logical address of data from a host logical address.

A data region that can be designated by each table becomes narrower as processing advances from the first table toward the third table. By reading out in order from the first table to the third table, a final NAND logical address of data can be acquired. In this manner, when the tables are configured to have a hierarchical structure, respective data sizes of the first table, the second table, and the third table can be decreased, and hence a time for reading each of the first table, the second table, and the third table can be reduced. Formation of such a hierarchical structure of the tables is particularly effective when a storage capacity of NAND chip 35 becomes large, i.e., when a data size of one physical address becomes large.

The NAND access control unit 30 acquires a physical address of the first table by using a host logical address. Then, the NAND access control unit 30 accesses one of the NAND chips 35-0 to 35-(n−1) by using the physical address of the first table and reads out the first table (a step S11-1). Subsequently, the NAND access control unit 30 acquires a physical address of the second table by using the first table. Then, the NAND access control unit 30 accesses any one of the NAND chips 35-0 to 35-(n−1) by using the physical address of the second table and reads out the second table (a step S11-2). Subsequently, the NAND access control unit 30 acquires a physical address of the third table by using the second table. Then, the NAND access control unit 30 accesses one of the NAND chips 35-0 to 35-(n−1) by using the physical address of the third table and reads out the third table (a step S11-3).

Subsequently, the NAND access control unit 30 acquires a NAND physical address of data by using the third table. Then, the NAND access control unit 30 accesses one of the NAND chips 35-0 to 35-(n−1) by using the NAND physical address and reads out the data (a step S12). The data read from the NAND chip 35 is supplied to the host device 10 by the DMA controller 26 (a step S13).

Figure 4:
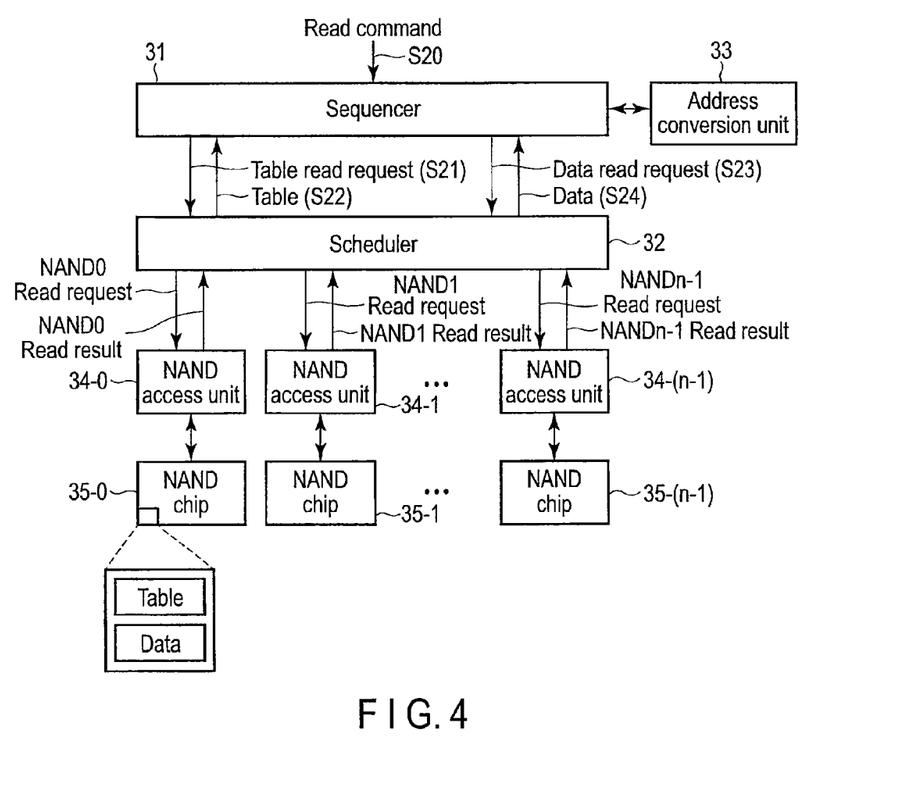
FIG. 4 is a schematic view for explaining a parallel access operation relative to NAND chips.

A parallel access operation relative to the NAND chips 35-0 to 35-(n−1) will now be described. FIG. 4 is a schematic view for explaining the parallel access operation relative to the NAND chips 35-0 to 35-(n−1). As shown in FIG. 4, NAND chip 35 stores, in addition to data, a table (an address table) to acquire a logical address of this data. It is to be noted that the data and the table corresponding thereto are not necessarily present in the same NAND chip, and they may be present in different NAND chips, or they may present in the same NAND chip.

The sequencer 31 receives a read command and a host logical address from the host device 10 (a step S20). Then, the sequencer 31 and the address conversion unit 33 acquire a physical address of a table required for acquiring a NAND logical address of data by using the host logical address. Subsequently, the sequencer 31 supplies a table read request and the physical address of the table to the scheduler 32 (a step S21). Then, the table is read from NAND chip 35 (a step S22).

Upon receiving from the scheduler 32 the table read from the NAND chip 35, the sequencer 31 and the address conversion unit 33 acquire a NAND physical address of the data designated by the host logical address. Then, the sequencer 31 supplies a data read request and the NAND physical address from the scheduler 32 (a step S23). Thereafter, the data is read from the NAND chip 35 (a step S24). Likewise, the sequencer 31 supplies table read requests and data read requests to the scheduler 32 in response to read commands transmitted from the host device 10. When the sequencer 31 receives from the scheduler 32 the data read from the NAND chip 35, it supplies the data to the host device 10.

Figure 5:
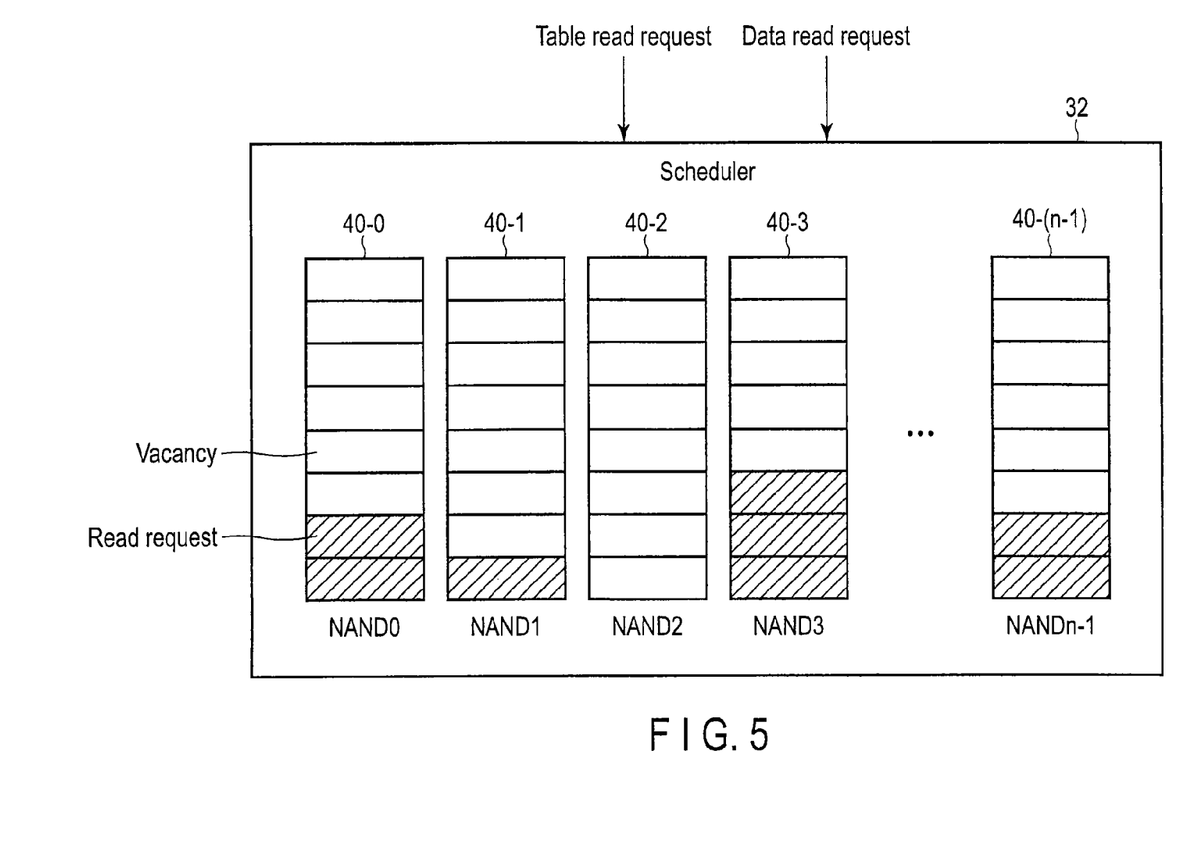
FIG. 5 is a schematic view showing an extracted storage unit of a scheduler.

Here, to enable the parallel access operation relative to the NAND chips 35-0 to 35-(n−1), the scheduler 32 comprises storage units corresponding to the NAND chips 35-0 to 35-(n−1). FIG. 5 is a schematic view showing extracted storage units in the scheduler 32.

The scheduler 32 comprises volatile storage units 40-1 to 40-(n−1) for storing read requests (including table read requests and data read requests) for the NAND chips 35-0 to 35-(n−1), respectively. Upon receiving the read requests from the sequencer 31, the scheduler 32 refers to physical addresses supplied together with the read requests and stores the read requests in the storage units 40 corresponding to the NAND chips 35 which are the read request destinations. It is to be noted that the physical addresses supplied together with the read requests may be stored in the storage units 40 together with the read requests, or the scheduler 32 may additionally comprise a volatile memory and store only addresses in the volatile memory. As a result, a storage capacity of the storage unit 40 can be reduced.

Figure 6:
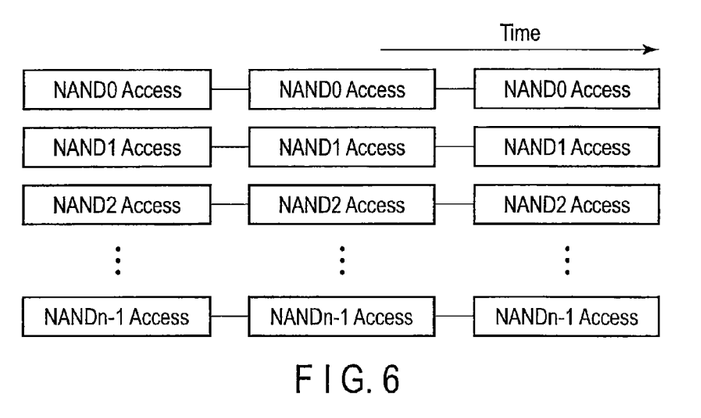
FIG. 6 is a schematic view of a parallel access operation with respect to the NAND chips.

The scheduler 32 supplies the read requests to the NAND access units 34-0 to 34-(n−1) in parallel. The respective NAND access units 34-0 to 34-(n−1) access the NAND chips 35-0 to 35-(n−1) to read tables or data. Then, the scheduler 32 receives read results from the NAND access units 34-0 to 34-(n−1) and supplies the read results to the sequencer 31. Additionally, the scheduler 32 supplies the read requests to the NAND access units 34-0 to 34-(n−1) in order of storage in the storage units 40 (i.e., in order of occurrence). With the above-described read operation, as shown in FIG. 6, the NAND access control unit 30 can access the NAND chips 35-0 to 35-(n−1) in parallel, and processing concerning the read requests is executed in ascending order by time.

Figure 7:
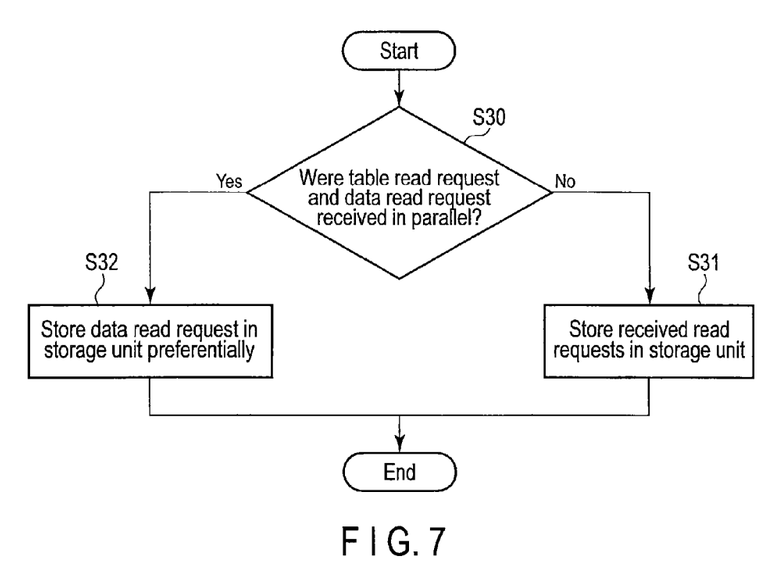
FIG. 7 is a flowchart for explaining a read request storage operation performed by the scheduler.

Here, for example, when the sequencer 31 continuously processes the read commands or data is sequentially read from the same NAND chip 35, a table read request and a data read request may be issued with respect to the same NAND chip 35 in parallel (substantially simultaneously). In such a case, the data read request is stored in the storage unit 40 prior to the table read request. FIG. 7 is a flowchart for explaining a read request storage operation performed by the scheduler 32.

The scheduler 32 monitors whether the same NAND chip 35 has received the table read request and the data read request from the sequencer 31 in parallel (a step S30). When the table read request and the data read request have not been received in parallel at the step S30, the scheduler 32 stores the read request in the corresponding storage unit 40 in order of reception from the sequencer 31 (a step S31).

On the other hand, when the table read request and the data read request have been received in parallel at the step S30, the scheduler 32 stores the data read request in the corresponding storage unit 40 prior to the table read request (a step S32).

By such a read request storage operation, the data read request is processed in priority to the table read request. As a result, the operation of reading data from the NAND chip 35 is executed on a priority basis, and the processing for the read command associated with this read data is further quickly completed. As a result, the data designated by the read command can be more quickly supplied to the host device 10, and further, the number of read commands the respective processes of which have not been completed can be reduced, and hence a load on the NAND access control unit 30 can be reduced.

Figure 8:
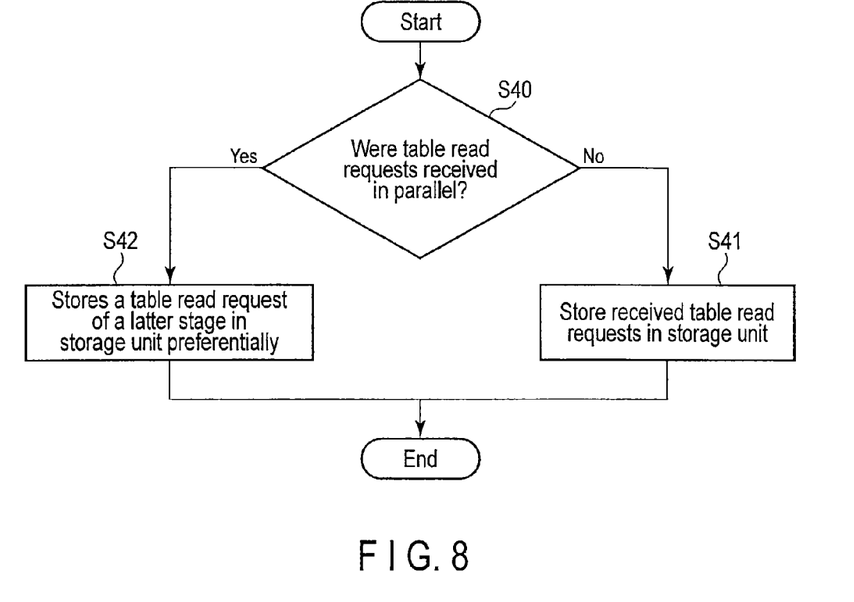
FIG. 8 is a flowchart for explaining a read request storage operation performed by a scheduler according to another structural example.

Additionally, when the table has the hierarchical structure, table read requests may be issued with respect to the same NAND chip 35 in parallel (substantially simultaneously). In such a case, a table read request used for reading a table of a latter stage (closer to data access) is stored in the storage unit 40 on a preferential basis. FIG. 8 is a flowchart for explaining a read request storage operation performed by a scheduler 32 according to another structural example.

The scheduler 32 monitors whether the same NAND chip 35 has received table read requests from the sequencer 31 in parallel (a step S40). When the table read requests have not been received in parallel at the step S40, the scheduler 32 stores the read request in the corresponding storage unit 40 in order of reception from the sequencer 31 (a step S41).

On the other hand, when the table read requests have been received in parallel at the step S40, the scheduler 32 stores the table read request of the latter stage in the corresponding storage unit 40 preferentially (a step S42).

By such a table read request storage operation, the table read request of the latter stage is processed on a priority basis. This enables the data read request to be processed at an earlier time; as a result, the data read request can be quickly processed. This enables the number of the read commands, which have not been processed, to be decreased; as a result, a load on the NAND access control unit 30 can be reduced.

(Modification)

Figure 9:
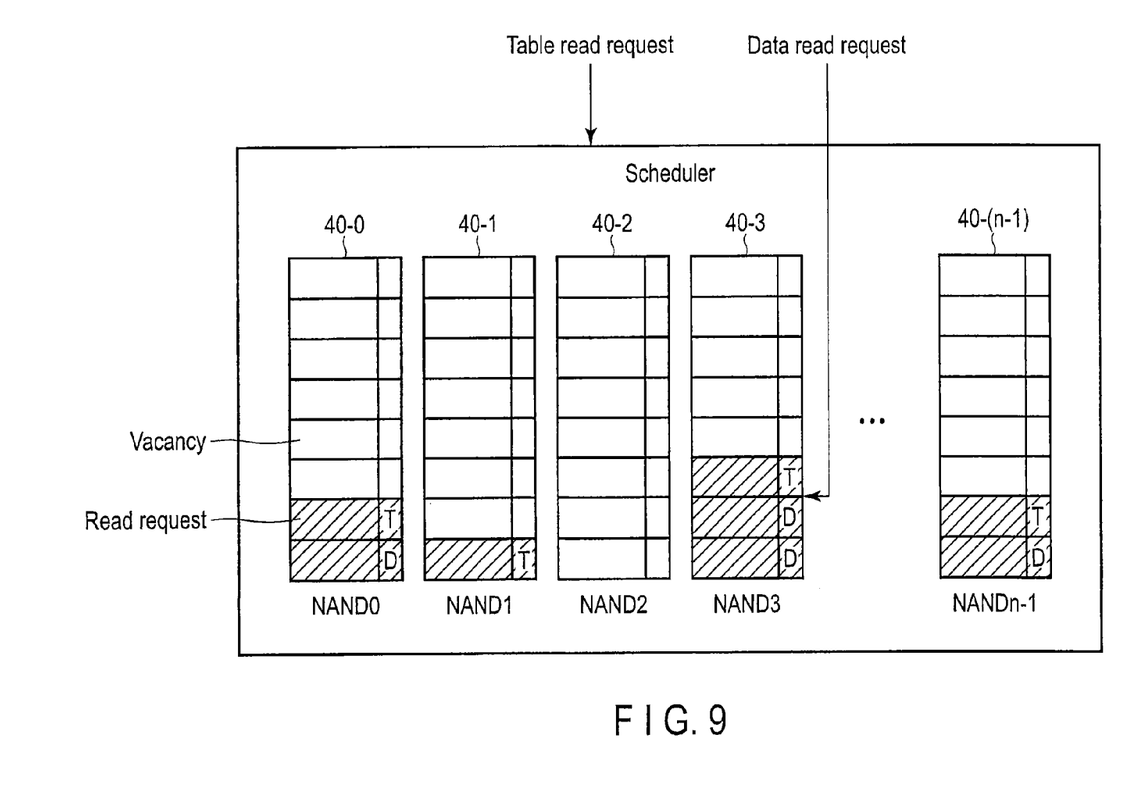
FIG. 9 is a schematic view showing an extracted storage unit of a scheduler according to a modification.

In a modification, a flag indicative of a table read request or a data read request is prepared for an entry of storage unit 40 included in the scheduler 32, and the data read request is stored in the storage unit 40 to interrupt before the table read request. FIG. 9 is a schematic view showing extracted storage units of the scheduler 32 according to the modification.

A region in which the flag indicative of the table read request or the data read request is stored is prepared for each entry in each storage unit 40. In the example shown in FIG. 9, when a read request received by the scheduler 32 is the table read request, a flag "T" is set in the storage unit 40 together with the table read request. When the read request is the data read request, a flag "D" is set in the storage unit 40 together with the data read request.

Upon receiving the data read request from the sequencer 31, the scheduler 32 confirms the flag in the corresponding storage unit 40. Moreover, the scheduler 32 stores the data request received this time after the already stored data read request and before the table read request. FIG. 9 illustrates an example of processing for interrupting data in the storage unit 40-3 with the data read request. To enable such control, as the storage unit 40 included in the scheduler 32, a storage unit that can cope with interrupt access is used.

According to this modification, data designated by a read command can be more quickly supplied to the host device 10.

Additionally, when the tables have the hierarchical structure, a table read request used for reading a table of a latter stage (closer to data access) is stored in the storage unit 40 preferentially. In this case, the flag "D" is formed of information that enables identification of the first table, the second table, and the third table. For example, a flag corresponding to the first table may be represented as "D1", a flag corresponding to the second table may be represented as "D2", and a flag corresponding to the third table may be represented as "D3".

Second Embodiment

In the first embodiment, the scheduler 32 comprises each storage unit 40 for each NAND chip 35. In a second embodiment, the storage units 40 in the first embodiment are integrated in one read request table, and an access table used for managing a read request issued for each NAND chip 35 is prepared. Further, the scheduler 32 executes scheduling of the read request by using the NAND access table.

[1. Configuration of Memory System]

Figure 10:
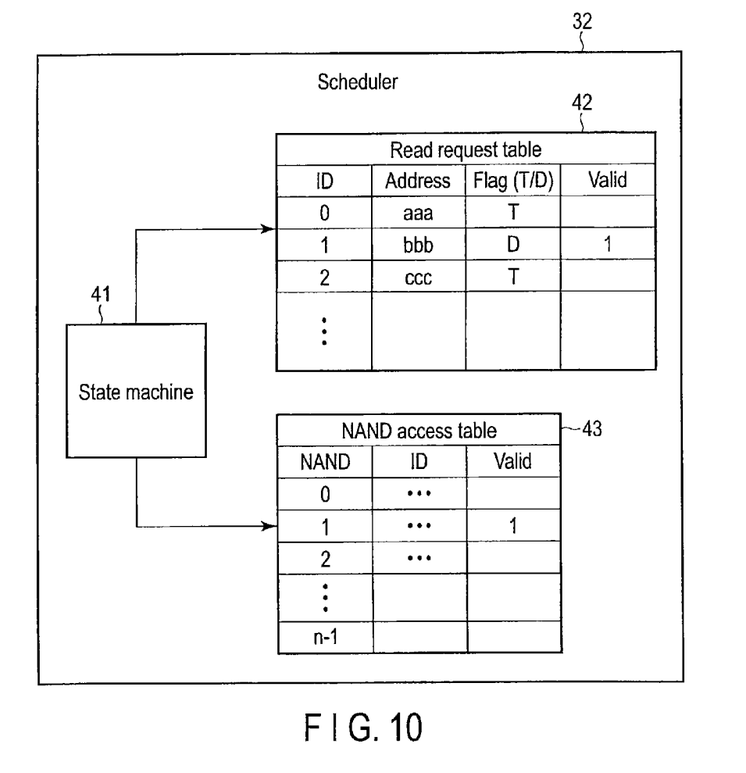
FIG. 10 is a block diagram showing a scheduler according to a second embodiment.

FIG. 10 is a block diagram of the scheduler 32 according to the second embodiment. Structures in a memory system 20 except the scheduler 32 are the same as those in the first embodiment. The scheduler 32 comprises a state machine 41, a read request table 42, and a NAND access table 43.

The read request table 42 stores read requests (including table read requests and data read requests) for all NAND chips received from a sequencer 31 in order of issue. In FIG. 10, older read requests are listed on the upper side. The read request table 42 stores a later-described ID, a physical address supplied together with a read request, a flag (T/D) indicative of a table read request or a data read request, and a valid flag, for each entry. The sequencer 31 adds a unique identifier (ID) to each read request so that the read requests can be identified.

The ID is information that can identify a read request, and it includes information indicative of an order of issue of each read request. The read request table 42 stores the ID added to each read request. The valid flag is used to confirm whether a read request corresponding thereto has been supplied to the NAND chip 35, i.e., whether the read request has been processed by the NAND chip.

The NAND access table 43 manages the read requests supplied to the NAND chips 35-0 to 35-(n−1). For this management, the NAND access table 43 has entries corresponding to the NAND chips 35-0 to 35-(n−1). The NAND access table 43 stores an ID of a read request that is being processed and a valid flag, for each NAND chip (for each NAND chip number). The NAND access table 43 is stored in a volatile memory included in the scheduler 32. The valid flag in the NAND access table 43 is the same information as the valid flag in the read request table 42.

The state machine 41 executes a read request scheduling operation by using the read request table 42 and the NAND access table 43.

[2. Operation of Memory System]

Figure 11:
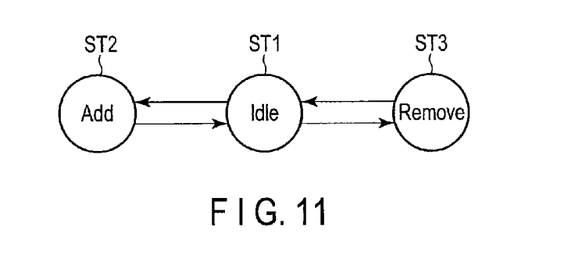
FIG. 11 is a schematic view for explaining an operation of a state machine.

An operation of the thus configured memory system 20 will now be described. Like the first embodiment, the scheduler 32 receives a read request from the sequencer 31. As shown in FIG. 11, the state machine 41 comprises an idle state ST1, an add state ST2, and a remove state ST3. The state machine 41 changes from the idle state ST1 to the add state ST2 upon receiving the read request from the sequencer 31.

In the add state ST2, the state machine 41 stores each read request supplied from the sequencer 31 in the read request table 42 in order of issue. At this time, the flag (T/D) indicative of the table read request or the data read request is added to each entry in the read request table 42. When the table read request and the data read request are issued in parallel, a priority is given to the data read request like the first embodiment and the modification of the first embodiment. Further, when tables have the hierarchical structure, a priority is given to a table read request for reading a table of a latter stage (closer to data access) like the first embodiment.

When the read request is stored in the read request table 42, the state machine 41 confirms a physical address supplied together with the read request, designates a NAND chip as an access destination, and confirms the valid flag in the NAND chip in the NAND access table 43. If the valid flag is not set, since the corresponding NAND chip is accessible, the state machine 41 supplies the read request and the physical address to a corresponding NAND access unit 34. Subsequently, the state machine 41 records an ID of the current read request in an entry of the corresponding NAND chip in the NAND access table 43 and sets the valid flag. Then, the processing in the add state ST2 is completed, and the state machine 41 returns to the idle state ST1.

In response to the read request, a table or data is read from the NAND chip 35 under control of the NAND access unit 34. The state machine 41 changes from the idle state ST1 to the remove state ST3 when a read result is supplied from the NAND access unit 34.

In the remove state ST3, the state machine 41 reads an ID from the entry of the NAND chip, which has obtained the read result, of the NAND access table 43, and further reads the entry of the corresponding ID of the read request table 42; and thereby determines whether it is the table read request or the data read request. Based on this information, the state machine 41 supplies a table read result or a data read result to the sequencer 31. Then, the state machine 41 resets the valid flag of the corresponding NAND chip in the NAND access table 43 and the valid flag of the corresponding ID in the read request table 42. Furthermore, the state machine 41 deletes the entry, the read processing of which has been completed, of the entries of the read request table 42.

Moreover, since the read processing of the NAND chip concerning the current read request has been completed, the corresponding NAND chip may process the next read request. Therefore, the state machine 41 searches for read requests, having destination physical address to the corresponding NAND chip, among the read requests present in the read request table 42, and newly supplies the oldest read request among the read requests having such destination physical address to the NAND access unit 34. At the same time, an ID of the corresponding read request is written into the NAND access table 43, and the valid flags in the read request table 42 and the NAND access table 43 are again set. On the other hand, the state machine 41 does not execute anything if a read request having a destination physical address to the NAND chip that has been through the read processing is not present in the read request table 42.

Additionally, the state machine 41 may refer to the flags (T/D) in the read request table 42, supply the oldest read request of the data flags "D" to the NAND chip preferentially, and supply the oldest read request of the table flags "T" to the NAND chip preferentially if there is no read request of the data flags "D". Then, the processing in the remove state ST3 is completed, and the state machine 41 returns to the idle state ST1.

Figure 12:
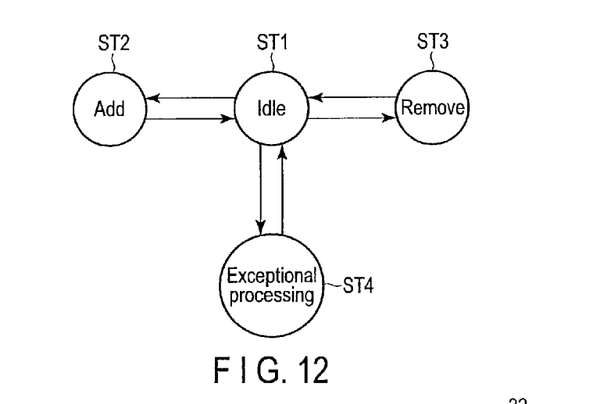
FIG. 12 is a schematic view for explaining an operation of a state machine according to another structural example.

It is to be noted that, as shown in FIG. 12, a state ST4 for enabling the state machine 41 to execute exceptional processing may be added as required. As the exceptional processing, there are address abnormality, operational abnormality (an ECC error or the like) of NAND chip, table look-up abnormality, and others. The address abnormality includes a case where a logical address exceeding address spaces of all NAND chips is supplied from the host. The table look-up abnormality includes a case where a read request is issued with respect to an address exceeding the address spaces of all NAND chips since an address of a table is wrong.

(Modification)

In the case of using an identifier (which will be referred to as a VID) different from the above described ID used for transmitting or receiving a read request or a read result between the sequencer 31 and the scheduler 32, the VID may be used in place of the above described ID. In this case, a time stamp clock is prepared to distinguish new and old read requests, and a time stamp is recorded in the read request table at a timing of input of each read request.

Figure 13:
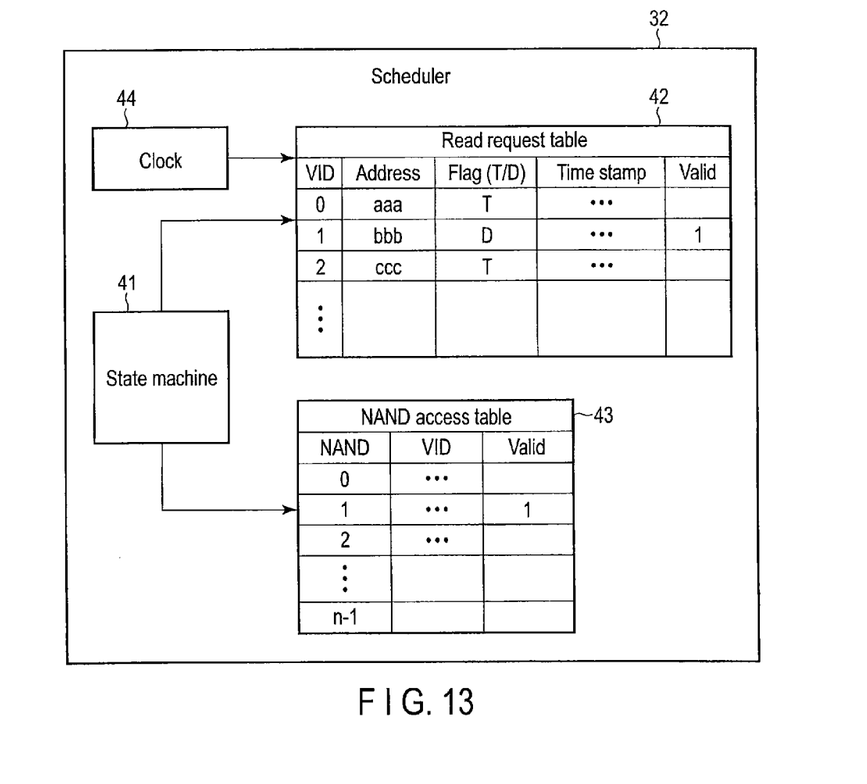
FIG. 13 is a block diagram of a scheduler according to a modification.

FIG. 13 is a block diagram of a scheduler 32 according to a modification. The scheduler 32 comprises a state machine 41, a read request table 42, a NAND access table 43, and a clock 44.

Foe each entry, the read request table 42 stores a VID, a physical address to be supplied together with a read request, a flag (T/D) indicative of a table read request or a data read request, a time stamp, and a valid flag. Although the VID is information that can identify a read request, it does not include information representing an order of issue of read requests, and so differs from the above described ID. The time stamp is a clock time at which the scheduler 32 receives a read request from the sequencer 31. As the time stamp, a clock time as measured by the clock (a timer) 44 is used. The read request table 42 is stored in a volatile memory included in the scheduler 32.

The NAND access table 43 has entries corresponding to the NAND chips 35-0 to 35-(n−1). The NAND access table 43 stores a VID of a read request that is being processed and a valid flag for each NAND chip (for each NAND chip number).

In the configuration in FIG. 13, when read processing of a NAND chip concerning a current read request is completed and a VID of a subsequent read request is written into the NAND access table 43, the state machine 41 executes an operation of searching for read requests having a destination address to the corresponding NAND chip among read requests present in the read request table 42, and further searching for a read request having the oldest time stamp among the read requests having such destination address. Other operations are the same as the operations using the above described ID.

Furthermore, when a table read request and a data read request are issued in parallel, a priority is given to the data read request, as in the first embodiment. As a technique for use in this situation, when the table read request and the data read request are issued in parallel, the state machine 41 records a time stamp of the data read request in the read request table in priority to a time stamp of the table read request. Moreover, when the table has the hierarchical structure, priority is given to a table read request for reading a table of a latter stage (closer to data access), which is the same as in the first embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
nonvolatile memories each storing data and an address table for acquiring an address of the data; and
a control unit which is configured to be capable of accessing the nonvolatile memories in parallel, and issues table read requests for reading the address tables and data read requests for reading the data to the nonvolatile memories in response to read commands from a host,
wherein, when a table read request and a data read request are issued to a same nonvolatile memory, the control unit processes the data read request in priority to the table read request.

2. The system of claim 1,
wherein the control unit reads out the address tables from the nonvolatile memories based on the table read requests, acquires addresses from the read address tables, and reads out data from the nonvolatile memories based on the acquired addresses and the data read requests.

3. The system of claim 1,
wherein the address table is comprised of table portions of a plurality of stages, and
the control unit reads out the table portions of the plurality of stages from the nonvolatile memories in order and acquires the address of the data from the table portion of a last stage.

4. The system of claim 3,
wherein, when table read requests are issued to a same nonvolatile memory, the control unit processes a table read request concerning the table portion of a latter stage on a priority basis.

5. The system of claim 1,
wherein the control unit comprises:
a sequencer which issues read requests comprising the table read requests and the data read requests; and
a scheduler which receives the read requests and manages the read requests for each of the nonvolatile memories, and
wherein the scheduler supplies each of the read requests to each corresponding nonvolatile memory in order of occurrence.

6. The system of claim 5,
wherein the scheduler comprises storage units provided to correspond to the nonvolatile memories, and
each of the storage units stores each read request issued to a corresponding nonvolatile memory.

7. The system of claim 6,
wherein the scheduler refers to the order of storage of the read requests in the storage units and determines old read request.

8. The system of claim 5,
wherein the scheduler comprises:
a request table for storing the read requests; and
an access table for managing each read request issued to each of the nonvolatile memories, and
wherein the access table manages a subsequent read request every time processing concerning a current read request is completed.

9. The system of claim 8,
wherein the storage unit stores an identifier for uniquely identifying the read request, and
the scheduler manages the read request by using the identifier.

10. The system of claim 8,
wherein the scheduler refers to the order of storage of the read requests in the request table and determines old read request.

11. The system of claim 8,
wherein, when the storage unit receives a read request from the sequencer, it stores a time stamp together with the read request, and the scheduler refers to the time stamp and determines each old read request.

12. The system of claim 1, further comprising:
memory access units which are connected to the nonvolatile memories, respectively, and access the nonvolatile memories.

13. The system of claim 1,
wherein each of the nonvolatile memories is a NAND flash memory.

14. A method of controlling a memory system comprising nonvolatile memories each of which stores data and an address table for acquiring an address of the data, the method comprising:
accessing the nonvolatile memories in parallel;
issuing table read requests for reading the address table and data read requests for reading the data, to the nonvolatile memories in response to read commands from a host; and
processing the data read request in priority to the table read request when the table read request and the data read request are issued to a same nonvolatile memory.

15. The method of claim 14, further comprising:
reading out the address tables from the nonvolatile memories based on the table read requests;
acquiring addresses from the read address tables; and
reading out data from the nonvolatile memories based on the acquired addresses and the data read requests.

16. The method of claim 14,
wherein the address table is comprised of table portions of a plurality of stages, and
the method further comprises:
reading out the table portions of the plurality of stages from the nonvolatile memories in order; and
acquiring the address of the data from the table portion of a last stage.

17. The method of claim 16, further comprising:
processing a table read request concerning the table portion of a latter stage on a priority basis when the table read requests are issued to a same nonvolatile memory.

18. The method of claim 14, further comprising:
supplying each read request to a corresponding nonvolatile memory in order of occurrence.

19. The method of claim 18,
wherein the memory system comprises storage units provided to correspond to the nonvolatile memories, and
wherein each of the storage units stores each read request issued to a corresponding nonvolatile memory.

20. The method of claim 18,
wherein the memory system comprises:
a request table for storing the read requests; and
an access table for managing each read request issued to each of the nonvolatile memories, and
wherein the access table manages a subsequent read request every time processing concerning a current read request is completed.

* * * * *